United States Patent [19]

Alpers et al.

[11] 4,176,887
[45] Dec. 4, 1979

[54] ENDLESS TRACK TRAVELING MECHANISM

[75] Inventors: Günther Alpers; Helmut Bentz, both of Dortmund, Fed. Rep. of Germany

[73] Assignee: O&K Orenstein & Koppel Aktiengesellschaft, Berlin, Fed. Rep. of Germany

[21] Appl. No.: 902,388

[22] Filed: May 3, 1978

[30] Foreign Application Priority Data

May 6, 1977 [DE] Fed. Rep. of Germany ........ 2720332

[51] Int. Cl.$^2$ .................... B62D 55/12; B62D 55/20
[52] U.S. Cl. ........................................ 305/57; 305/14; 305/58 R
[58] Field of Search ................. 305/57, 58 R, 14, 60, 305/56, 11

[56] References Cited

U.S. PATENT DOCUMENTS

| | | | |
|---|---|---|---|
| 2,003,528 | 6/1935 | Best | 305/57 |
| 2,452,921 | 11/1948 | Gillespie | 305/57 X |
| 2,823,082 | 2/1958 | Bauer | 305/57 X |
| 3,073,657 | 1/1963 | Oxford | 305/14 |
| 3,116,957 | 1/1964 | Fikse | 305/14 |
| 3,333,903 | 8/1967 | Orr et al. | 305/57 X |
| 3,359,044 | 12/1967 | Boggs | 305/57 |
| 4,003,608 | 1/1977 | Carter | 305/57 |
| 4,030,178 | 6/1977 | Luebkemann | 305/14 X |

FOREIGN PATENT DOCUMENTS 975828 10/1975 Canada ....................... 305/11

*Primary Examiner*—Robert J. Spar
*Assistant Examiner*—John P. Shannon
*Attorney, Agent, or Firm*—Martin A. Farber

[57] ABSTRACT

A caterpillar-type travelling mechanism for vehicles provided with a self-propelled drive, particularly hydraulic dredges, with a drive sprocket wheel, a guide wheel for the guidance of the caterpillar chain and chain links connected with one another by bolts. Cam-shaped teeth are arranged on the drive sprocket wheel in its longitudinal center plane, the teeth being provided on the sides which point toward one another with planar surfaces. The drive sprocket wheel is provided on its outer periphery with two running rims for the chain links, the rims being arranged on both sides of the teeth. The cam-like teeth are arranged on the periphery of a wheel flange, the latter on both sides being provided with inclined surfaces for guiding the chain links. The travelling mechanism plates of the chain links, which plates are formed as double-stud plates, are made of one piece with a two-sided cam arranged centrally in the chain link. The engagement surfaces of the two-sided cam, which engagement surfaces face the cam-like teeth, during the engagement are formed as contact surfaces for the cam-shaped teeth.

8 Claims, 7 Drawing Figures

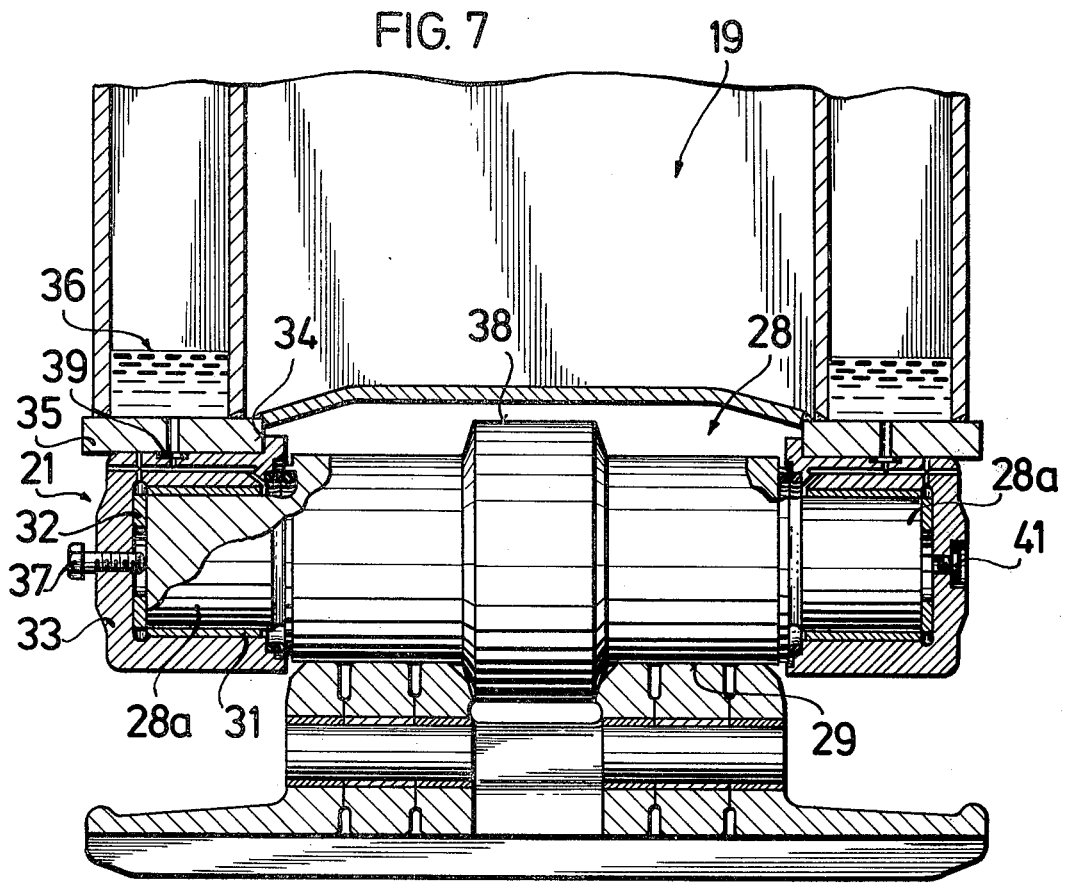

ENDLESS TRACK TRAVELING MECHANISM

BACKGROUND OF THE INVENTION

Field of the Invention

An endless track travelling mechanism for vehicles provided with a self-propelled drive, particularly hydraulic dredges, with a drive sprocket or wheel, a guide wheel for the guidance of the tractor chain or endless track and chain links, the latter being connected to one another by bolts.

In one known endless track travelling device (German Petty Patent GM 6,602,459), the chain wheel for the drive (drive sprocket or drive wheel of the endless track) is provided with running rims arranged to the side of the sprocket wheel teeth. In this way, the result is obtained that the chain links rest on the sprocket wheel itself, so that the teeth only transmit the pulling force. The weight of the entire vehicle therefore no longer rests on the bushings and pins or bolts of the chain as in the case of the previously known vehicles, but it is taken up by the sprocket wheel. In this known arrangement, however, the entire tractive force must be transmitted in each case by a single tooth, there being merely line contact at the bushings and pins. In addition to this, the teeth have a large ratio of slenderness or coefficient of fineness (about 15°). Thus the known drive sprocket is not suitable for the transmitting of high tractive forces.

The object of the present invention is to create an endless track or travelling mechanism, which despite the very great dead weight of the vehicle driven thereby makes it possible to transmit high tractive forces at relatively high speed of travel, and whereby the material from the ground which has come between the teeth and the chain cannot lodge or seat itself firmly in the chain, so that a long life of the chain is assured.

BRIEF SUMMARY OF INVENTION

This object is achieved in accordance with the invention in the manner that cam-shaped teeth are arranged on the drive sprocket in the longitudinal central plane of the sprocket, the teeth being provided on the sides which face each other with flat surfaces, that the drive sprocket is provided on its outer circumference with two running rims, arranged on both sides of the teeth, for the chain links, that the cam-like teeth are arranged on the circumference of a wheel flange which is provided on both sides with inclined surfaces for the guiding of the chain links, that the bottom plates of the chain links, which plates are developed as double-stud rail plates, are produced in one piece with a two-sided cam arranged centrally in the chain link, and that the surfaces of the two-sided cam which face the cam-like teeth with the engagement are developed as contact surfaces for the cam-shaped teeth.

Further details of the arrangement in accordance with the invention are contained in the dependent claims and in the following description.

The advantage of the arrangement in accordance with the invention resides in the fact that the doubled connecting bolts of the endless tractor chain which are arranged on both sides of the toothed rim, offer large working or application surfaces for the transmission of the tractive force and these large working surfaces of attack are retained for a long life of the chain due to the fact that, as a result of the development of the pyramid-shaped tooth point, no "climbing" of the chain can take place because no material which has been loosened from the earth can deposit in the chain.

One embodiment of the invention is illustrated in the drawings. It shows:

BRIEF DESCRIPTION OF DRAWINGS

FIG. 7 is a view of the roller with partial sections of the roller, of the bearing arrangement and of the travelling-gear plates, along the line VII—VII of FIG. 1.

DETAILED DESCRIPTION OF INVENTION

Figure 1:
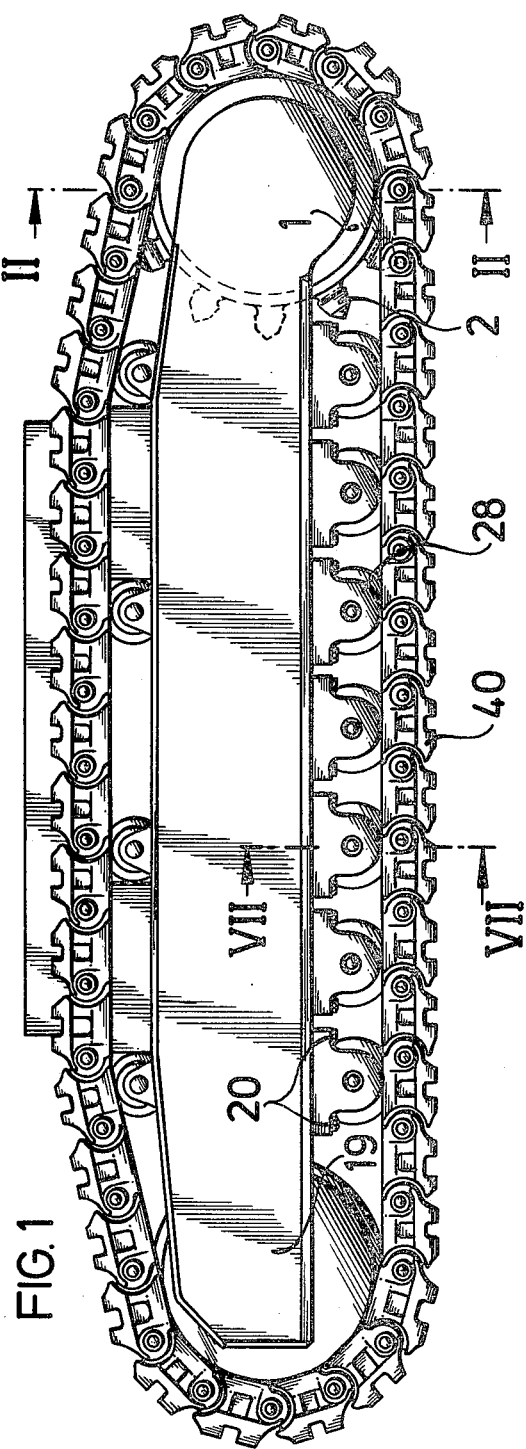
FIG. 1 is an elevational view of a track-laying caterpillar mechanism.
Figure 2:
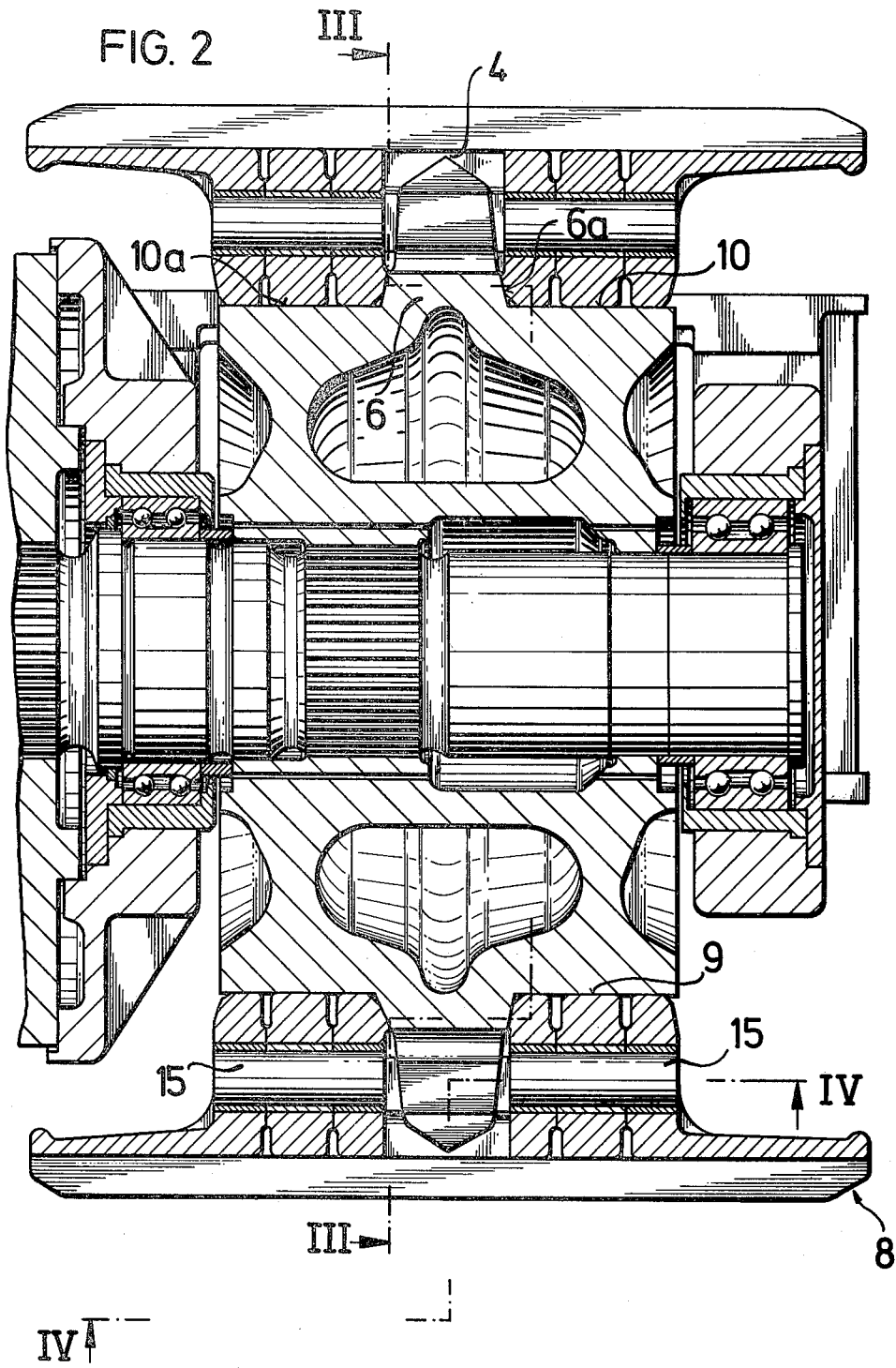
FIG. 2 is a section along the line II—II of FIG. 1.
Figure 3:
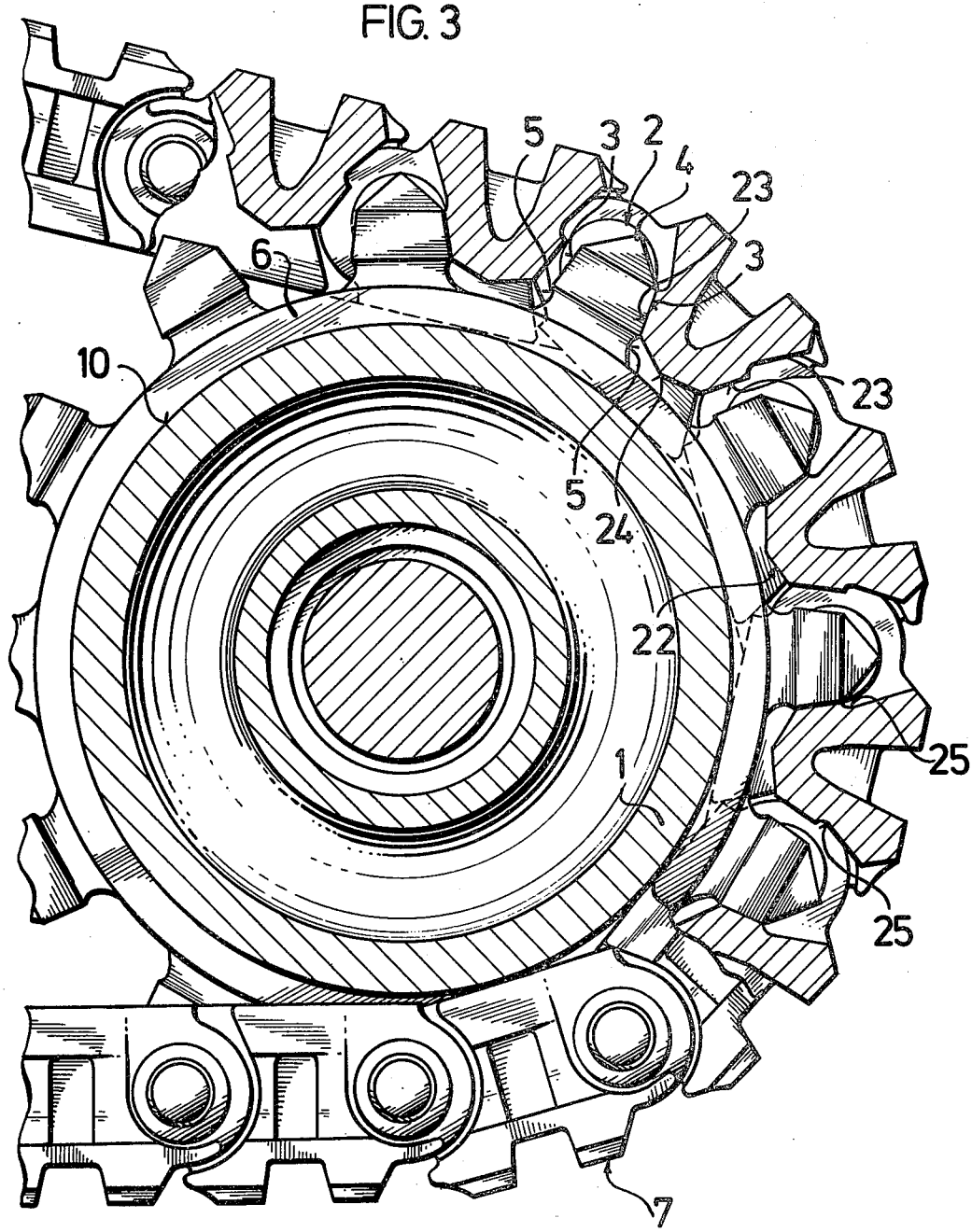
FIG. 3 is a cross section along the line III—III of FIG. 2.
Figure 4:
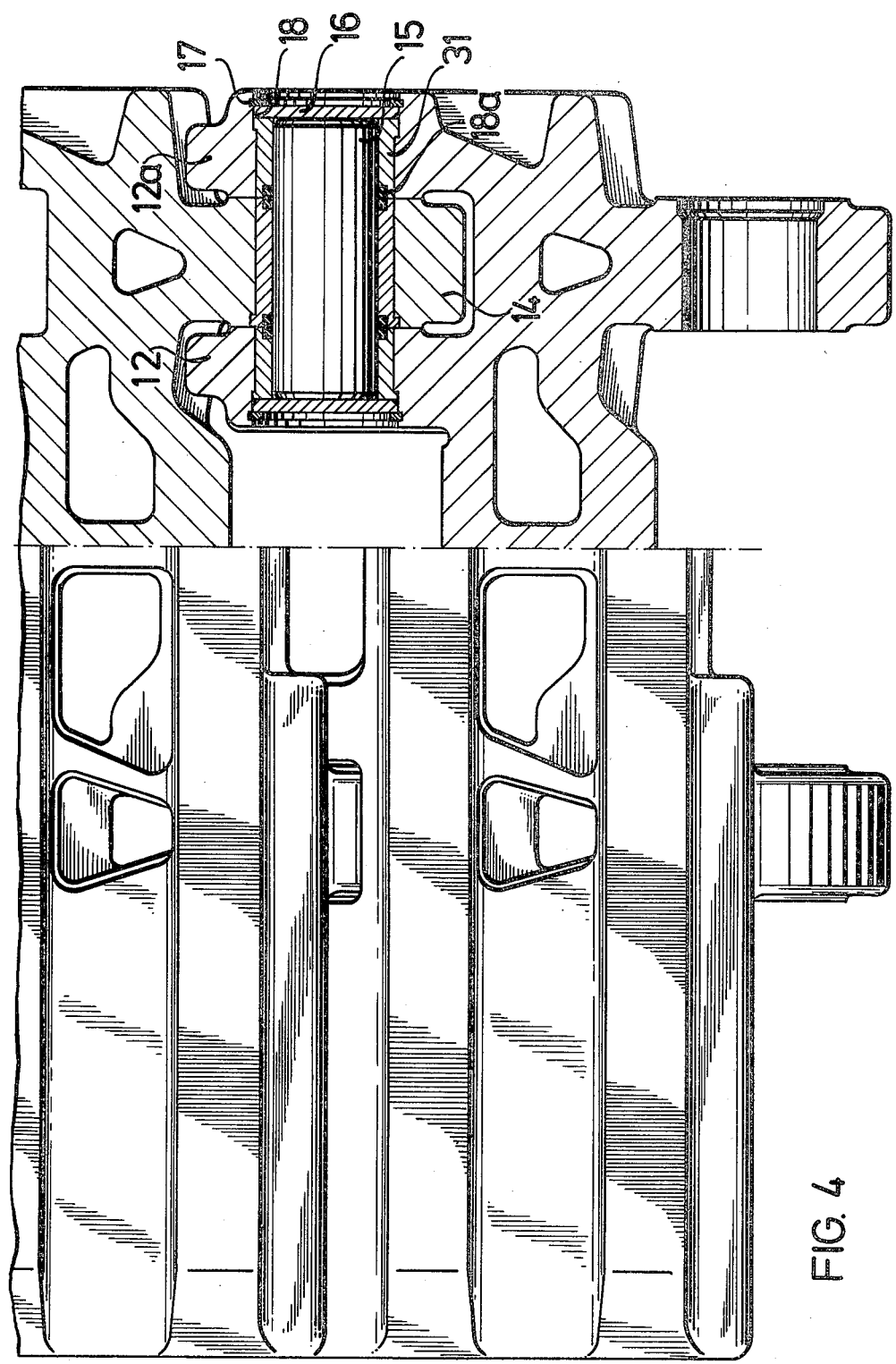
FIG. 4 is a top plan view of the travelling-gear plates and a partial section through the connection of the chain links along the line IV—IV of FIG. 2, both on a larger scale.
Figure 5:
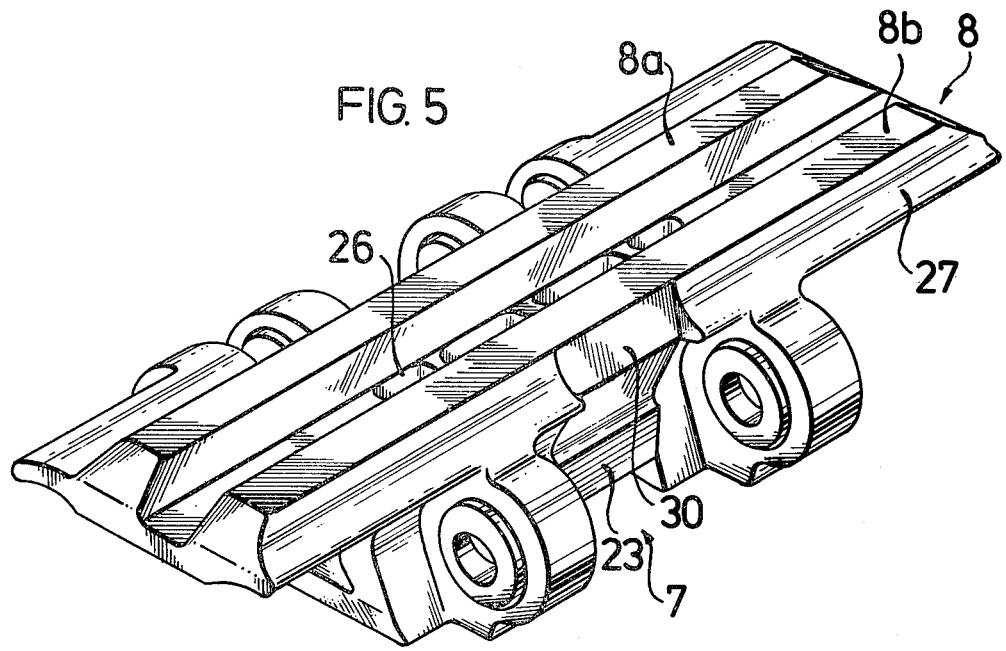
FIG. 5 is a perspective view of a chain link from the bearing or support side.
Figure 6:
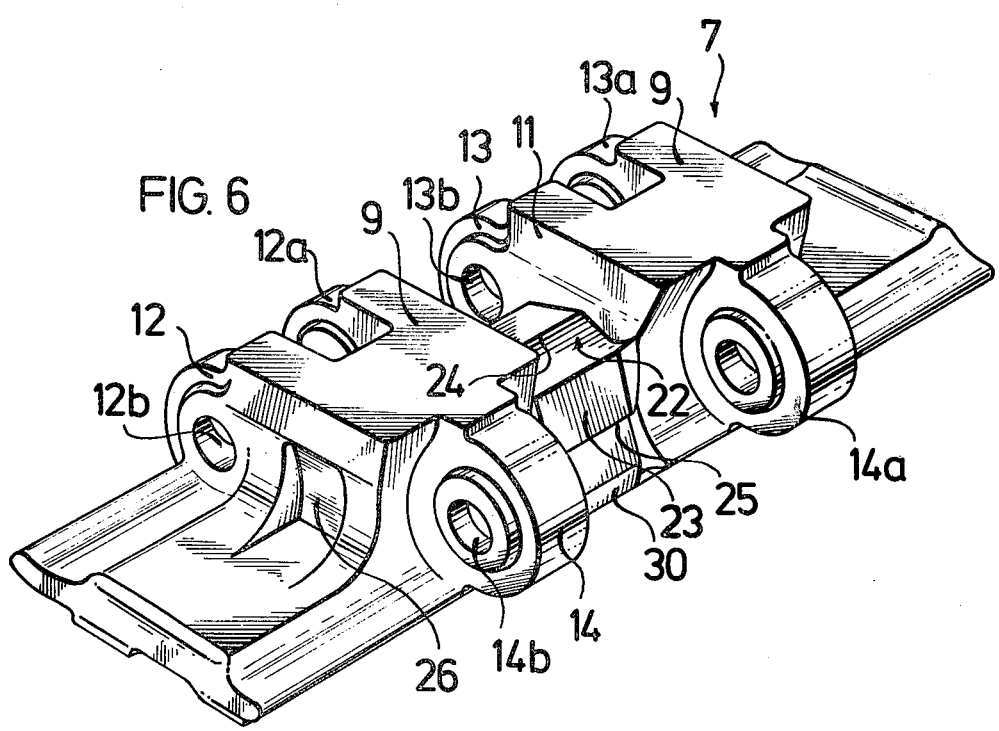
FIG. 6 is a perspective view of a chain link of the reverse side to that of FIG. 5.

On the periphery of the drive wheel or sprocket drum 1 of an endless track travelling device there are arranged cam-shaped teeth 2, which teeth are provided, on the sides thereof facing each other, with straight engagement surfaces 3. The teeth 2 are furthermore provided with a pyramidal-shaped point 4. At the foot or base of the cam-like teeth 2 there are provided recesses 5 which extend transversely to the direction of travel. In the longitudinal direction, the cam-like teeth 2 are arranged on the periphery of a wheel flange 6 which serves for the guiding of the chain links 7 (FIGS. 5 and 6). Each chain link 7 is a single-piece casting and bears on its side facing the ground the travelling mechanism plates 8 (double stud plates), which plates extend over the entire width of the chain 40 transversely to the direction of travel and are provided with two studs (double studs) 8a, 8b, the latter serving for a non-skid or slip-proof toothing indenting and engagement of the chain 40 with the ground. The vehicle which is carried by the endless track travelling device is supported by means of the running rims 10, 10a of the drive sprocket wheel 1 on the two flat support surfaces 9 of the chain links 7. The lateral forces occurring transverse to the travelling device are assumed by the inclined surfaces 11 of the chain links 7 and of the flange 6, which surfaces 11 adjoin the support surfaces 9. By means of the two outer brackets or joint bars 12, 12a and 13, 13a, which brackets are arranged in pairs parallel to each other, and of the inner brackets or joint bars 14, 14a of the chain link 7, the width of the inner joint bars 14 and 14a, respectively, corresponding to the distance of the outer joint bars 12 and 12a or 13 and 13a, respectively, from each other, the chain links 7 are connected with each other by bolts or pins 15. The pins or bolts 15 are mounted floatingly and are inserted through bores 12b, 13b and 14b (which bores are provided with bushings 31) of the outer joint bars 12, 12a and 13, 13a and of the inner joint bars 14, 14a. In this way, the pins 15 and 15a are rotatably supported both in the joint bars 12, 12a and 13, 13a, respectively, and in the joint bars 14 and 14a, respectively. By means of washers or discs 16, snap rings 17 and O-rings 18, the bolts 15 are secured against lateral displacement and sealed. The bushings 31 are provided at their opposing or opposite end surfaces between the inner brackets 14 and 14a and the outer brackets 12, 12a, and 13, 13a, with grooves to receive packings or seals 18a in order to prevent dirt from penetrating into the pivot points of the links 7. As can be noted from FIGS. 2 and 4, the bolts 15 are not formed as one continuous piece, but rather the bolts 15 are provided for the outer brackets or joint bars 12, 12a and 13, 13a and the inner brackets or joint bars 14 and 14a of the chain links 7, the brackets riding on the running rims 10 and 10a on each side of the cam-like teeth 2. As can be noted from FIG. 3, the chain links 7 are not only provided with the parts mentioned above, but are also provided with a double-sided cam 22 also formed in one piece with the chain links 7, the flat engagement surfaces 23 of the cam coming to engagement during the operation of the endless track travelling mechanism, against the flat engagement surfaces 3 of the cam-like teeth 2 of the drive wheel or sprocket 1, and thereby transmit very high traction forces.

The recesses 5 are arranged transversely on the cam-like teeth 2 and the recesses 25 are arranged transversely on the double-sided cams 22. As soon as the engagement surfaces 3 and 23 of the cam-like teeth 2 and the two-sided cams 22 respectively wear down as a result of abrasion, the ends of the engagement surfaces 3 and 23 would dig or tilt into each other so that the engagement of the cam-like teeth 2 in the two-sided cams 22 would be interfered with. This is prevented by the recesses 5 and 25. The two-sided cams 22 are provided with a knife-edge 24. In this way, the material which has been loosened from the ground during the rotation of the travelling chain 40 and has entered between the track rim flange 6 and the two-sided cams 22 is crushed to such an extent that it cannot become seated or lodged firmly therein. The endless track mechanism plates 8 of the chain links 7 are formed in the vicinity of the two-sided cam 22 on both sides with wedge-shaped extending-out inclined surfaces 30 and on the outer edges on one side with a wedge-shaped extending-out inclined surface 27. The recesses 26 are provided in order to make the chain link 7 lighter. The bores 12b, 13b, and 14b serve to receive the pins 15.

The ends of the rollers 28 are formed as journals or bearing pins 28a. Since the roller 28 does not contain the bore for a shaft which is customary in the known arrangement, the diameter of the roller 28 may be small so as to keep its weight light. The pressure produced by pressing between the roller 28 and the brackets 12, 12a, 13, 13a and 14, 14a is reduced as a result of the broad support on both sides of the flange 38. The two journals 28a are housed in bearing housings 33, which housings are provided with bushings 31 and with shoulder discs or washers 32, the bearing housings being provided towards the running surface 29 with two contact edges 34, which edges are supported axially on the lower shoulder or flange 35 of the track carrier 19. This support serves to detension or release the screws 20 from load in the axial direction of the rollers, since the forces occurring here, as is known from experience, are greater than the frictional forces resulting in the direction of travel from the rolling movement and the load. In order that the contact edges 34 can rest reliably against the bottom shoulders 35 of the endless track carrier 19, before the tightening of the screws 20 on the lower shoulders 35 of the endless track carrier 19, a screw 37 is screwed from the outside in the end of the bearing housing 33 against the journal or bearing pin 28a, as a result of which the contact edges 34 of the bearing housing 33 are pressed against the inner sides of the lower shoulder 35 of the track carrier 19. After the tightening of the screws 20, the screw 37 is removed and the screw opening in the bearing housing 33 is closed by a screw 41. The supplying of the roller bearing 21, which is provided with lifetime permanent lubrication, is effected from above out from the oil chamber 36 through openings sealed with O-rings 39. Thus the bushings 31, which are loaded with pressure from above, and which are arranged in the bearing housings 33, are always supplied with sufficient oil, so that dry or mixed friction is substantially avoided.

We claim:

1. An endless track travelling mechanism for vehicles provided with a self-propelled drive, particularly hydraulic dredges, comprising
   an endless track chain comprising a plurality of chain links, the latter bearing travelling mechanism plates, and bolt means for connecting said chain links with one another,
   guide wheel means for guiding said endless track chain,
   a drive sprocket wheel having cam-shaped teeth arranged thereon in a longitudinal center plane thereof, said teeth being formed on sides facing one another with planar surfaces,
   said drive sprocket wheel having an outer periphery forming two running rims thereon abutting said chain links, said running rims being arranged on both sides of said teeth,
   said drive sprocket wheel being formed with a wheel flange, said cam-shaped teeth being arranged on said wheel flange, the latter on both sides thereof having inclined surface means for guiding said chain links thereon,
   said travelling mechanism plates of said chain links each are formed as double-stud plates and are produced from one piece with a two-sided cam arranged centrally in said chain link, said two-sided cam having engagement surfaces facing said cam-shaped teeth engaging therewith and during engagement constitute contact surfaces for said cam-shaped teeth.

2. The endless track travelling mechanism according to claim 1, wherein
   said bolt means comprises two bolts each connecting two adjacent of said chain links with one another,
   said chain links are formed with sealed-off inner brackets and outer brackets,
   said bolts each have a length equal to the width of one of said running rims,
   said bolts are freely rotatably mounted in said inner brackets and said outer brackets of said two adjacent chain links.

3. The endless track travelling mechanism according to claim 1, wherein
   said cam-shaped teeth of said drive sprocket wheel have free ends formed as pyramid-shaped points.

4. The endless track travelling mechanism according to claim 1, wherein
   said two-sided cams of said chain links extend into a cutter edge in a direction pointing toward the outer diameter of said wheel flange, the latter constituting means for guiding of said chain links via said inclined surface means.

5. The endless track travelling mechanism according to claim 1, wherein said travelling mechanism plate of said chain link is formed in the vicinity of said two-sided cam on both sides with inclined surfaces extending outwardly into wedge shapes, respectively, and on outer edges thereof on one side with an inclined surface extending out into a wedge shape.

6. The endless track travelling mechanism according to claim 1, wherein each of said cam-shaped teeth of said drive sprocket wheel has a tooth base, and each of said cam-shaped teeth between the tooth base and said planar surfaces, respectively, is formed with a recess, the latter extends crosswise to each of said teeth, said two-sided cams of said chain links, respectively, are formed with a recess on both sides thereof in transition from said engagement surfaces to said travelling mechanism plates, respectively, said engagement surfaces are planar and contact said planar surfaces of said teeth during the engagement.

7. The endless track travelling mechanism according to claim 1, further comprising a track carrier, said drive sprocket wheel is rotatably mounted in said track carrier, a plurality of rollers having forged bearing pins on ends of said rollers, respectively, said bearing pins are operatively rotatably mounted in said track carrier, said rollers engage said chain links.

8. The endless track travelling mechanism according to claim 7, further comprising bearing housings secured to said track carrier, said bearing housings have contact edges axially abutting said track carrier, said bearing pins are rotatably mounted in said bearing housings, screw means for being removably screwed in said bearing housings in a direction of the central axis of said rollers thereagainst for bracing said contact edges of said bearing housings axially against said track carrier.

* * * * *